July 21, 1953  L. H. MORIN  2,646,378
METHOD OF PRODUCING PLASTIC RIMMED SPOOLS
Filed March 5, 1951
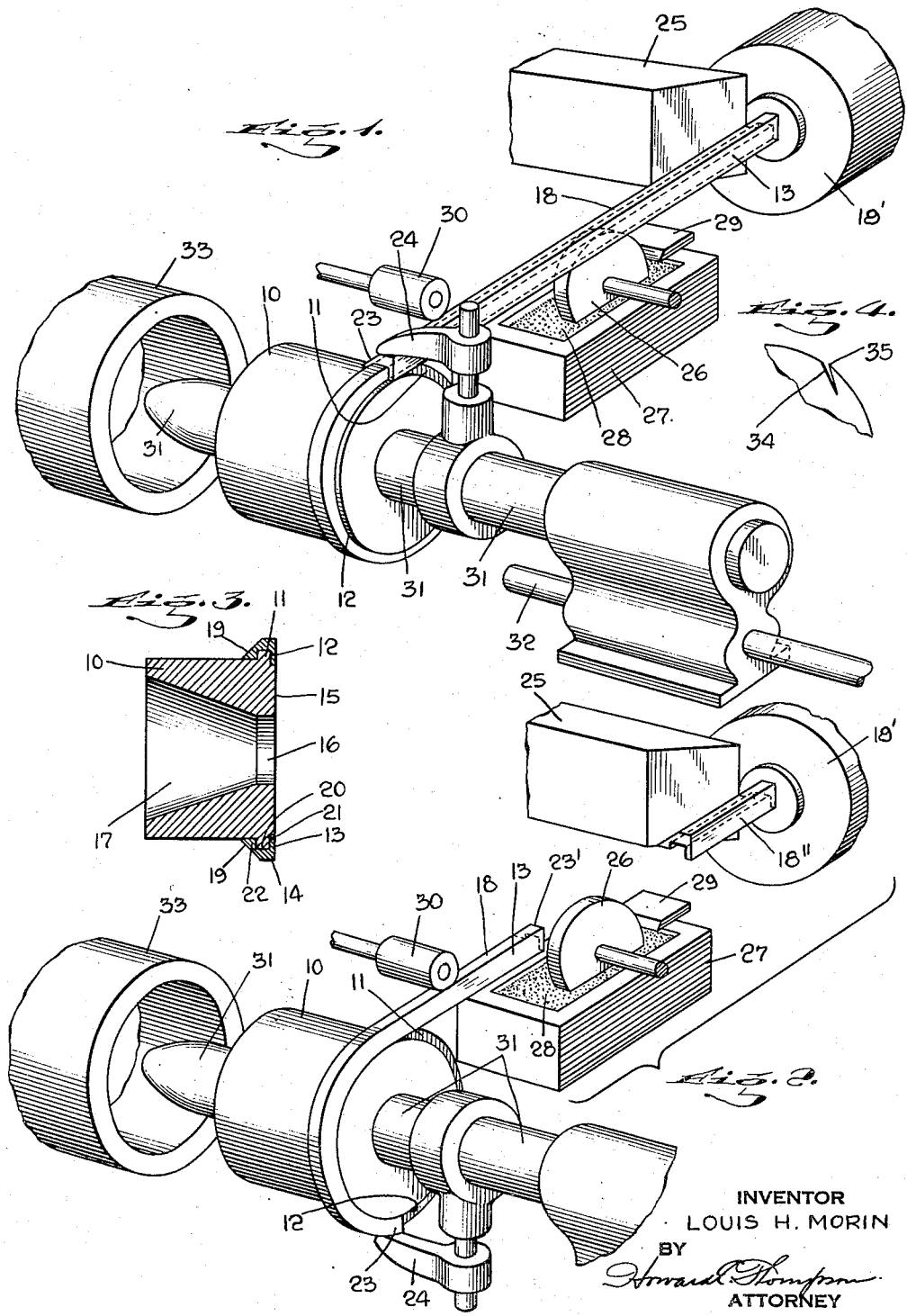
INVENTOR
LOUIS H. MORIN
BY
*Howard Thompson*
ATTORNEY Patented July 21, 1953

2,646,378

UNITED STATES PATENT OFFICE 2,646,378

METHOD OF PRODUCING PLASTIC RIMMED SPOOLS

Louis H. Morin, Bronx, N. Y., assignor to Coats & Clark Inc., a corporation of Delaware Application March 5, 1951, Serial No. 213,967

9 Claims. (Cl. 154—81)

This invention relates to spools such, for example, as spools on which thread is wound. More particularly, the invention deals with the method of applying a plastic rim to the flanged end of a spool by extruding a strip of plastic material of predetermined cross-sectional contour and directly applying and securing the same to the spool flange in forming a plastic rim, particularly in providing a rim of this kind which adapts the spool for the formation of a non-chippable nick or notch for the reception of a thread end. Still more particularly, the invention deals with a method, wherein an adhesive is directly applied to the extruded plastic strip for adhesion of the strip to the flange of the spool as the strip is wound thereon.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic view illustrating the first steps in the method of applying an extruded strip to the flange of a spool body.

Fig. 2 is a view similar to Fig. 1 showing parts in a different position.

Fig. 3 is a sectional detail view through a spool body with an extruded plastic strip fixed to the flanged end thereof; and Fig. 4 is a fragmentary end view of the rim portion of a spool showing a nick therein.

My present invention deals with a method of applying plastic rims to the end or ends of a spool body to provide means for forming a thread receiving nick or notch therein, which would not be subjected to chipping or breakage, as is commonly experienced with wooden spools of this type and kind. Plastic rims of the general type and kind under consideration have been applied to spools by die casting the same directly onto the spool bodies in a manner taught in other applications filed by me, later to be identified by serial number. My present invention, however, deals with the application of an extruded plastic strip to a body of this type and kind for the purposes stated.

In Fig. 3 of the drawing, I have shown at 10 a half spool body, it being understood that two of such bodies can be adhesively or otherwise coupled together to form a complete spool. The body 10, in the construction shown, has an annular outwardly projecting flange 11 adjacent one end, the surface of said end of the body being recessed, as seen at 12, in order that the outer surface 13 of the resulting plastic rim 14 can be disposed in alinement with the end surface 15 of the body 10. In the construction shown, the body 10 has, adjacent the surface 15, a concentric bore 16 for guidance of the spool on its mounting when the spool is in use and inwardly of the bore 16 is a flared or conical bore 17, which will materially reduce the overall weight of the resulting complete spool. The spool body 10 may be turned from wood or like material or may be moulded from various compositions that are fibrous, or this body may be made from metal, depending entirely upon the use to which the resulting spool is applied.

The rim 14 is formed from a plastic strip or element 18, note Figs. 1 and 2, extruded from the nozzle 18' of a conventional extruding machine, not shown, and the strip 18 is substantially of channel cross-sectional form, clearly shown in Fig. 3. In other words, it has a flat perpendicular outer surface, as at 13, and a bevelled inner surface, as at 19, and the body of the strip has a groove 20 adapted to fit snugly on the flange 11 of the spool body. The outer wall 21 of the strip 18 having the surface 13 is of greater depth than the wall portion 22 having the bevelled surface 19, as will clearly appear from a consideration of Fig. 3.

In Figs. 1 and 2 of the drawing, I have diagrammatically illustrated the method of treating and applying the strip 18 to the flange 11 of the spool body 10. The strip 18 is extruded to a predetermined length, when one end 23 thereof is brought below, and held by, a gripper 24 firmly on the flange 11 of the spool, as seen in Fig. 1. At this moment, a knife 25 shears the extruded strip 18 to form thereof a workpiece length and thus define the opposite end 23' of the strip or workpiece. As the strip 18 is initially extruded from the nozzle 18', the same is guided by suitable means, not shown, to pass over a glue or adhesive applying roller 26, rotatable in a receptacle 27 storing adhesive 28. At 29 is shown a stripper or scraper for removing surplus glue or adhesive from the roller 26. The roller applies adhesive in the groove 20 of the strip 18. As the strip 18 advances, it passes beneath a roller 30, which is normally raised to a slight extent, as noted in Fig. 1, until the strip is thereunder and then moved downwardly, the roller assisting in wrapping the strip around the spool body, as will be apparent. At this time, it is well to state that the extruded plastic strip is still in a warm and more or less pliable state, at least sufficiently pliable to facilitate formation of the strip around the flange portion of the spool body.

After the end 23 of the strip 18 has been brought beneath the gripper, the gripper having been raised to a slight extent facilitating insertion therebeneath, the gripper, together with the spool body, is rotated in the manner partially seen in Fig. 2 of the drawing, so as to wind the strip 18 on the flange 11 of the body 10 and this operation is continued until a complete cycle of rotation has been completed and the end 23′ brought into abutting engagement with the end 23.

At the end of this operation, the gripper 24 is released, the roller 30 retracted and the finished spool, with the rimmed strip formed thereon, is then stripped from the supporting mandrel 31 by means of an ejector pin 32, note Fig. 1, the spool body 10 being delivered to and fed into a sleeve 33 which engages the bevelled wall portion 19 of the rim 14 and holds the same until the glue or adhesive sets in securely fixing the strip 18 to the spool body in forming the resulting plastic rim 14.

It will be understood that any number of the plastic supporting sleeves 33 can be employed and brought into registering position with the mandrel 31 for reception of successive rimmed spool bodies. Spool bodies can be inserted on the mandrels by hand or in any other described manner. The cycle of operation may be more or less continuous, the extrusion of the strip 18 being synchronized with the other operation, so that sufficient time will be provided for insertion of a new spool on the mandrel 31 in position to receive the next successive extruded strip, part of which is seen at 18″ in Fig. 2 of the drawing. It will be understood that the mandrel 31 remains at rest with the gripper 24 in the raised position shown in Fig. 1, until such time as the end 23 of an extruded strip is engaged by the gripper. The illustrations in the accompanying drawing are diagrammatic, particularly in omitting the various means for actuating the several devices or mechanisms defined.

As an alternative method, the bore of the sleeve 33 may be of sufficient diameter to receive the rim portion of the spool and, in ejecting the spool from the mandrel, the ejector pin 32 delivers the spool into the sleeve 33 and the rim 14 is held in firm position on the spool body until set. With this procedure, the advancement of the next successive rim spool will feed the previous spool in the sleeve and the sleeve 33 may be of sufficient length to receive a large number of the spools, giving sufficient holding time for setting of the cement or adhesive. In this connection, it will be understood that the sleeve may be heated, or otherwise treated to assist in this operation.

From the foregoing, it will be apparent that an extruded plastic strip or strand of any desired cross-sectional form can be directly applied to a rotating body and fixedly secured thereto. One advantage in this particular method of procedure over other methods lies in the fact that no waste of the plastic material prevails, thus avoiding objection to injection moulding methods, where gates or other trimmings are either lost or require re-handling and processing. Furthermore, my present conception lends itself for utilization of various types and kinds of plastic materials which can be extruded in the manner defined. Extrusions of this type and kind can be single color plastics, whereas in some instances, it might be desirable to extrude multicolor plastic to produce mottled or varied color effects in the resulting rimmed or encircled product. In the present disclosure, I have shown one form of cross-sectional contour to the extruded strip fitting a corresponding formation of the product, but these formations may be varied on different products, as will be apparent.

Generally speaking, my method comprises the steps of extruding a plastic element of predetermined cross-sectional contour, severing the extruded element to form a workpiece length, applying an adhesive to a surface of the extruded workpiece and utilizing said adhesive in fixedly securing the workpiece to a supporting body. In some instances, it will be desirable to move the supporting body with the workpiece adhered thereto to means holding the workpiece on the body, while the adhesive employed is setting. However, in some instances, this operation can be dispensed with, as the adhesive itself will be sufficient to support the workpiece, particularly in some types and kinds of workpieces. In this connection, it will be understood that the present illustration of my invention is only one of many adaptations and uses of the method.

In regard to the production of thread spools, the invention also includes the step of preliminarily forming a flanged spool having a turned-down portion on one or both flanged ends. With molded spools, which may be of the kind described in the above mentioned applications, this forming step, of course, may be done by means of an appropriately shaped mold or molds, while with wood spools a fabricating step may be necessary. The invention further includes the nicking of the flanged end of the finished spool by cutting through the solid plastic rim thereon to form a thread holding nick. In Fig. 4, I have shown a fragmentary end view of the rim portion of a spool, with a nick 34 therein. In forming the nick 34, a raised lip 35 is formed to guide the thread into the nick. As will be appreciated, the plastic rim permits the nicking step to be accomplished without danger of chipping the spool flange, and the nick so produced is not subject to chipping, as are nicks of conventional spools.

Full spools, as well as the half spools shown in the drawing, may be treated as described. That is to say, a plastic rim or strip may be applied to each flange of a full spool one at a time, or a double extrusion and winding mechanism may be employed to apply a plastic strip to each flange at the same time. It will be apparent that the extrusion method of forming a strip and applying the same to a spool can be conducted in a very fast operation, so as to expedite the production of plastic rim spools.

In some cases, finished spools having but one plastic-tipped flange may be all that is required, and of course such spools are within the purview of the invention.

It is also feasible to form a quantity of plastic strip in advance of applying it to spools. In this case, the strip may be wound up in rolls which will then deliver the strip as and when it is desired to wind it on spools, as described.

Having fully described my invention, what I claim as new and desire to secure by Letters Patent is:

1. The herein described method of applying a plastic rim to a body having a circumferential flange, which comprises extruding an elongated plastic strip of channel cross-sectional form, passing the extruded strip into contact with adhesive to coat the channel of said strip, feeding one end of the strip onto the flange of said body, pressing said end of the strip firmly on the flange and body, severing the moving strip to form a workpiece length, then rotating said body to wind the strip around the flange thereof until the opposed end of the strip is in engagement with the first named end of the strip, thus forming an annular rim around said flange, and then delivering the rimmed body to a rim-engaging station to hold the same for an adhesive setting period.

2. The herein described method of applying a plastic rim to a body having a circumferential flange, which comprises mounting a flanged body on a rotatable mandrel including a radially movable gripper, extruding an elongated plastic strip of channel cross-sectional form adjacent the body, passing the extruded strip over an adhesive applying wheel which applies adhesive to the channel of said strip, feeding one end of the strip onto the flange of said body, moving said gripper into engagement with said end of the strip for firm support on the flange and body, severing the extruded strip to form a workpiece length, then pressing the strip into engagement with said body at a point adjacent the body, then rotating said mandrel and gripper together with said body to wind the strip around the flange of said body until the opposed end of the strip is brought into abutting engagement with the first end thereof in completely enveloping the flange of said body in a rim, and then ejecting the rimmed body and delivering the same to a rim-holding station until the adhesive becomes set.

3. The herein described method of circumferentially enveloping an annular body with an elongated plastic strip of a cross-sectional contour conforming with that part of the body to which the strip is to be applied comprising fashioning the strip to a length substantially equal to the circumference of the body on which the strip is to be applied, delivering one end of the strip to the body, gripping said end of the strip on the body, rotating the body together with the gripped plastic strip in winding the strip on said body to form a complete annulus of the strip on the body, and then ejecting the body with the wound strip thereon, preparatory to the formation of a next successive product.

4. The herein described method of circumferentially enveloping an annular body with an elongated plastic strip of a cross-sectional contour conforming with that part of the body to which the strip is to be applied comprising fashioning the strip to a length substantially equal to the circumference of the body on which the strip is to be applied, delivering one end of the strip to the body, gripping said end of the strip on the body, rotating the body together with the gripped plastic strip in winding the strip on said body to form a complete annulus of the strip on the body, then ejecting the body with the wound strip thereon, preparatory to the formation of a next successive product, and applying adhesive to portions of the strip, prior to winding the same on said body to aid in securing the strip to said body.

5. The herein described method of applying extruded plastic strip material onto a body fixed to a rotatable mandrel, which comprises severing said strip to length, delivering one end of a severed strip onto said body, gripping said end of the strip on the body, then rotating the body with the gripped strip thereon in winding the strip on the body, and then ejecting the body from said mandrel.

6. The method of producing a thread spool having a nonchippable thread nick therein which comprises forming a flanged spool having a turned-down portion on at least one flanged end thereof, supporting the spool at a plastic strip receiving station, continuously extruding a plastic strip at an extrusion station adjacent said first station and passing the same to the flange of said spool, applying adhesive to the underside of the moving strip as it approaches said flange, continuing to move the strip forward until it is in contact with the spool flange, clamping the strip to the flange and then beginning to rotate the spool with the end of the strip clamped thereto while coincidently severing the strip at a point adjacent the extrusion station to form a strip length equal to the peripheral length of said flange, guiding the unapplied length of strip as it approaches the rotating spool to be wound on the flange, continuing the rotation of the spool until the entire length of strip is applied to the flange and so that the last applied end of said strip length abuts the first applied end, then stopping the rotation of the spool, releasing the strip from said clamped position relative to the spool, ejecting the strip-containing spool from said first station preparatory to moving a second spool into said first station to receive the next succeeding plastic strip, and nicking the flanged end of the strip-containing spool by cutting through the plastic strip thereon to form a thread-holding nick in the plastic strip.

7. The method of producing a thread spool having a nonchippable thread nick therein which comprises forming a flanged spool having a turned-down portion on at least one flange end thereof, extruding a plastic strip from a plastic strip extrusion station spaced from and alined with said spool, passing the strip to the flange of said spool, applying adhesive to the underside of the moving strip as it approaches said flange, clamping the strip to the flange and then beginning to rotate the spool with the end of the strip clamped thereto while coincidently severing the strip at a point adjacent the extrusion station to form a strip length equal to the peripheral length of said flange, continuing the rotation of the spool until the entire length of strip is applied to the flange and so that the last applied end of said strip abuts the first applied end, then stopping the rotation of the spool, removing the strip-containing spool from said position in alinement with said extrusion station, and nicking the flanged end of the strip-containing spool by cutting through the plastic strip thereon to form a thread-holding nick in the plastic strip.

8. The method of producing a thread spool having a nonchippable thread nick therein which comprises forming a flanged spool having a turned-down portion on at least one flanged end thereof, supporting the spool in spaced and alined relation to a source of plastic strip-material, passing said plastic strip to said flange of said spool, applying adhesive to the underside of the moving strip as it approaches said flange, continuing to move the strip forward until it is in contact with the spool flange, clamping the strip to the flange and then beginning to rotate the spool with the end of the strip clamped thereto while coincidently severing the strip at a point adjacent said source to form a strip length equal to the peripheral length of said flange, guiding the unapplied length of strip as it approaches the rotating spool to be wound on the spool flange, continuing the rotation of the spool until the entire length of strip is applied to the flange and so that the last applied end of said strip abuts the first applied end, then stopping the rotation of the spool, removing the strip-containing spool from said spaced and alined position, and nicking the flanged end of the strip-containing spool by cutting through the plastic strip thereon to form a thread-holding nick in the plastic strip.

9. The method of producing a thread spool having a nonchippable thread nick therein which comprises forming a flanged spool having a turned-down portion on at least one flanged end thereof, supporting the spool in spaced and alined relation to a source of plastic strips, passing a length of strip equal to the peripheral length of said flange to the flange of said spool, applying adhesive to the underside of the moving strip as it approaches said flange, clamping the strip to the flange and then rotating the spool with the end of the strip clamped thereto until the entire length of strip is applied to the flange and so that the last applied end of said strip abuts the first applied end, then stopping the rotation of the spool, releasing the strip from said clamped position relative to the spool, ejecting the strip-containing spool from said spaced and alined position, and nicking the flanged end of the strip-containing spool by cutting through the plastic strip thereon to form a thread-holding nick.

LOUIS H. MORIN.

References Cited in the file of this patent

UNITED STATES PATENTS

| Number | Name | Date |
|---|---|---|
| Re. 19,536 | Parks | Apr. 16, 1935 |
| 1,451,470 | Peelle | Apr. 10, 1923 |
| 2,048,995 | Clinton | July 28, 1936 |
| 2,470,835 | Paffen et al. | May 24, 1949 |
| 2,494,351 | Montero | Jan. 10, 1950 |